United States Patent [19]
Okazaki et al.

[11] Patent Number: 4,739,544
[45] Date of Patent: Apr. 26, 1988

[54] METHOD OF MANUFACTURING A VAPOR-PHASE-DIFFUSED BOUNDARY-LAYER TYPE MULTILAYER CERAMIC CAPACITOR

[75] Inventors: Kiyoshi Okazaki, Yokohama; Hideji Igarashi, Yokosuka, both of Japan

[73] Assignee: Mitsubishi Mining and Cement Co., Ltd., Tokyo, Japan

[21] Appl. No.: 940,339

[22] Filed: Dec. 11, 1986

Related U.S. Application Data

[63] Continuation-in-part of Ser. No. 263,166, May 13, 1981, abandoned.

[30] Foreign Application Priority Data

May 20, 1980 [JP] Japan .................................. 55-66918

[51] Int. Cl.⁴ ...................... C01G 22/01; H01C 23/59
[52] U.S. Cl. .................................. 29/25.42; 361/308; 361/311; 361/313; 361/315; 361/320; 361/330; 501/136; 501/137

[58] Field of Search ................. 29/570, 25.42; 357/10, 357/71; 361/308, 311, 313, 315, 320, 330; 501/137, 136; 252/623 BT

[56] References Cited

U.S. PATENT DOCUMENTS 4,367,265  1/1983  Yu et al. .............................. 428/697

Primary Examiner—Olik Chaudhuri

[57] ABSTRACT

A method of manufacturing a miniaturized multilayer ceramic capacitor having high capacitance which comprises a dielectric body of the type that the grain boundaries thereof are insulated. Multilayer chips are prepared which consist of a semiconductor ceramic material whose major constituent comprises titanate of alkaline-earth metal such as Ba, Sr or the like; and such chips are placed within a container formed of a fired mixture of $CuO$ and $Al_2O_3$ and subjected to a heat treatment so that copper ions which serve as insulating agent, are caused to uniformly diffuse from vapor phase in crystal grain boundaries of the semiconductor ceramics body of each of the chips.

3 Claims, 2 Drawing Sheets

METHOD OF MANUFACTURING A VAPOR-PHASE-DIFFUSED BOUNDARY-LAYER TYPE MULTILAYER CERAMIC CAPACITOR

This application is a Continuation-in-Part of earlier application Ser. No. 263,166 filed May 13, 1981, now abandoned.

BACKGROUND OF THE INVENTION

1. Field of the Invention

This invention relates to a method of manufacturing a miniaturized multilayer ceramic capacitor having high capacitance.

2. Description of the Prior Art:

Recently, as a result of the development of large-scale integration techniques for such devices as IC, LSI and so forth, high-density packaging of electronic components with respect to a circuit substrate has been pursued at a rapid pace so that there have been ever-increasing demands for miniaturized, high capacitance type electronic components such as capacitors to be used in peripheral circuits for integrated circuits.

It is multilayer ceramic capacitors that can most effectively satisfy the above-mentioned demands. Multilayer ceramic capacitors comprise thin dielectric layers which are superimposed upon each other so that increased effective electrode areas can be realized and an increased electrostatic capacitance per unit area can be achieved; thus such capacitors have a reduced size and an increased capacitance.

A promising method of making multilayer ceramic capacitors was proposed by Waku, NTT Special Report, No. 28 (1975) and Yamaoka et al, Advances in Ceramics, Vol. 1, (1981) pp. 232-241). The proposed method comprises the steps of burning a semiconductor ceramic disk the base material of which may be $BaTiO_3$ or $SrTiO_3$, for example; applying an insulating additive such as, for example, $CuO$ or $Bi_2O_3$ onto the burned semiconductor ceramic disk and then subjecting the disk to a heat treatment to cause the insulating additive to be thermally diffused into the grain boundaries of the semiconductor ceramics, thereby forming a boundary layer structure wherein only the grain boundary portions are insulated; and attaching metal electrodes to the disk. Such a method may be referred to as "solid-phase boundary-layer method" which is adapted to produce capacitors by utilizing an apparent relative permittivity in the range of about 10,000-50,000. However, the conventional method mentioned just above is only applicable in an attempt to produce products of the so-called veneer type and is unable to meet the needs of the times in that it has only a limited capability of achieving capacitors of a reduced size and an increased capacitance.

In view of what has been mentioned above with respect to the prior art, the inventors have made an extensive study in an attempt to achieve a capacitor which is miniaturized and yet of a high capacitance, by taking into account of the advantages of the conventional "solid-phase boundary-layer method", and in the course of the study, have considered fabricating a multilayer capacitor in the form of a solid-phase boundary-layer structure for achieving a ceramic capacitor of a reduced size and an increased capacitance. More specifically, the inventors have considered the possibility that such a capacitor may be achieved by a process which comprises the steps of providing a layer-built structure including ten to several ten layers superimposed upon each other, each of the layers being constituted by a semiconductor ceramics film which may be made of $BaTiO_3$, for example, as mentioned above and having metal paste applied thereon which serves as an electrode; pressing the layer-built structure; and thereafter sintering the superimposed semiconductor ceramics films and metal paste at the same time. Heretofore, however, it has never been thought of to form such a layer-built structure on the basis of the aforementioned conventional solid-phase boundary-layer method. This is because in the conventional solid-phase boundary-layer method, a grain boundary insulating additive is previously applied to the layer-built structure and then such structure is subjected to a heat treatment so that the additive is thermally diffused into the grain boundaries of the semiconductor ceramics; thus if a layer-built structure such as mentioned above is prepared and if it is attempted to cause the insulating additive supplied thereto to be thermally diffused in the grain boundaries of the semiconductor ceramics constituting the layer-built structure, the below-mentioned difficulties are experienced when the insulating additive is applied and thermally diffused.

In the case where $PbO$ or $Bi_2O_3$ is applied as the insulating additive as in the prior art, there is the tendency that the insulating additive is caused to react with Pd, Pd-Ag or the like, which was used for inner electrodes, at a temperature at which a heat treament for thermal diffusion of the insulating additive is effected, so that the inner electrodes may be damaged. Thus, $PbO$ or $Bi_2O_3$ was unsuitable for use as insulating additive for layer-built ceramic structure.

In the case where $CuO$ is used as the insulating additive, no reaction with the inner electrodes is caused so that such electrodes are prevented from being subjected to such damages as mentioned above. With a structure wherein $CuO$ is directly applied onto a body of ceramics and thermally diffused therein, however, remarkable dispersions occurred in the dielectric characteristics thereof so that uniform insulation of the grain boundaries in the ceramic body could hardly be achieved.

SUMMARY OF THE INVENTION

In view of what has been mentioned above with respect to the prior art techniques, the inventors have made an extensive study and as a result thought of a method of manufacturing a capacitor comprising s dielectric chip wherein the grain boundaries thereof are uniformly insulated.

It is an object of the present invention to provide a method of manufacturing a miniaturized multilayer type ceramic capacitor having high capacitance and both the advantages of a boundary-layer type ceramic capacitor and those of a multilayer type capacitor.

Another object of the present invention is to provide a method of manufacturing a novel and improved multilayer ceramic capacitor comprising of a semiconductor ceramic chip having the grain boundaries thereof insulated with an insulating additive diffused from vapor phase.

Still another object of the present invention is to provide a method of manufacturing a multilayer ceramic capacitor having high capacitance, wherein a multilayer cermic chip is disposed in a container consisting of $CuO$ and $Al_2O_3$ and subjected to a heat treatment so that Cu ions are caused to uniformly diffuse in vapor phase into the grain boundaries of the semiconductor ceramics.

Other objects, features and advantages of the present invention will become apparent from the ensuing description taken in conjunction with the accompanying drawings.

BRIEF DESCRIPTION OF THE DRAWINGS

Referring to FIG. 1, there is shown the vapor-phase-diffused boundary-layer type layer-built ceramic capacitor according to the present invention, which comprises a vapor-phase-diffused boundary-layer type ceramics body 1, inner electrodes 2 which are alternately exposed at the opposite end surfaces of the vapor-phase-diffused boundary-layer ceramics body 1, and outer electrodes 3 which are provided to connect the exposed portions of the inner electrodes at the respective end surfaces of the body 1. As shown in FIG. 2, the vapor-phase-diffused boundary-layer type multilayer ceramic capacitor has a uniform distribution of Cu in the crystal grain boundaries.

Figure 1:
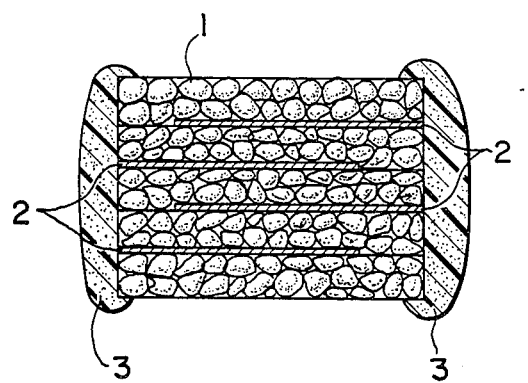
FIG. 1 is an enlarged schematic sectional view showning an example of the vapor phae-diffused boundary-layer type multilayer ceramic capacitor produced by the process of the present invention.

The present invention will now be described in further detail.

In the process of fabricating the present boundary-layer type multilayer ceramic capacitor, semiconductor ceramic green sheets whose major constituent may be BaTiO$_3$ or SrTiO$_3$, are prepared by means of a doctor-blade process, an extrusion process or the like, and then metal paste consisting of Pd, Pd-Ag or the like is applied onto the surfaces of the green sheets in a predetermined pattern to form inner electrodes. Subsequently, a desired number of the semiconductor ceramic green sheets having the metal paste applied thereon are superimposed upon each other in such a manner that the semiconductor ceramics sheets and the metal paste overlap each other, so that a layer-built structure is obtained. Thereafter, the layer-built structure is pressed with heating, and then cut into layer-built chips having a predetermined dimension. The layer-built chips thus obtained are fired at a temperature of 1380° C. for two hours, for example. To prepare the aforementioned layer-built structure, it may also be possible to employ a print process wherein semiconductor ceramic paste and inner electrode forming metal paste are alternately printed.

Thereafter, insulation is effected with respect to the crystal grain boundaries of the semiconductor ceramics constituting the resultant sintered layer-built chips. In the process of the present invention, a desired number of layer-built chips are placed in a cylindrical container consisting of CuO and Al$_2$O$_3$ previously sintered at 1200° C. for example, in such a manner as to be disposed out of direct contact with the container, and the chips are subjected to a heat treatment at a temperature in the range of 1100°–1250° C. for 2–10 hours.

As a result of the heat treatment, copper ions and/or copper oxide vapor is caused to emanate out of the container which includes in itself copper ions and/or copper oxide, so that the vapor is uniformly distributed in the space inside the container, and the copper ions are permitted to uniformly diffuse in the grain boundaries of the multilayer ceramic semiconductor chips which are uniformly enveloped in the gas atmosphere inlcuding copper ions as well as copper oxide. Such a state is illustrated in FIG. 2.

The vapor pressure of CuO represents a vapor pressure of $153 \times 10^{-4}$ (N/m$^2$) at 800° C. and a vapor pressure of $906 \times 10^{-4}$ at 950° C. (see "The Oxide Handbook: Ed. by G. V. Samsonov—Translated by C. Nigel Turto, et al.—IFI/PLENUM, 1973). It also represents a vapor pressure of about $10^{-1}$ (atm) at about 1000° C. and a vapor pressure of about $4 \times 10^{-1}$ (atm) at about 1080° C. (see "Thermophysical Properties of High Temperature Solid Materials, Vol. 4, Part 1, Ed. by Y. S. Touloukian, Thermophysical Properties Research Center). It is considered that the pressure of vapor containing copper ions will further build up in the temperature range of 1100° C.–1250° C. It is also considered reasonable from the standpoint of thermodamics that when a semiconductor ceramic chip is enveloped in the vapor containing copper ions, the copper ions will be permitted to diffuse into the semiconductor ceramic chip with a concentration corresponding to the chemical potential of the copper ions contained in the vapor.

Figure 2A:
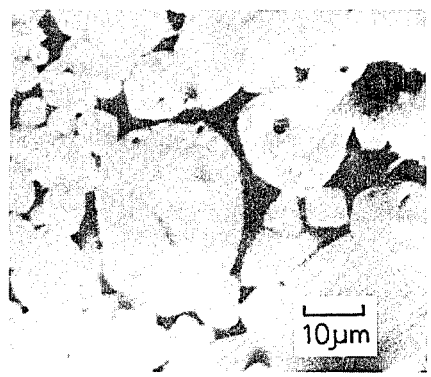
FIG. 2 illustrates microscopic pictures of crystal grain boundary insulation structure as taken by the use of an X-ray microanalyzer (EPMA), wherein (A) shows a secondary electron image and (B) indicates a CuK$\alpha$ ray image of the same portion as that in (A).
Figure 2B:
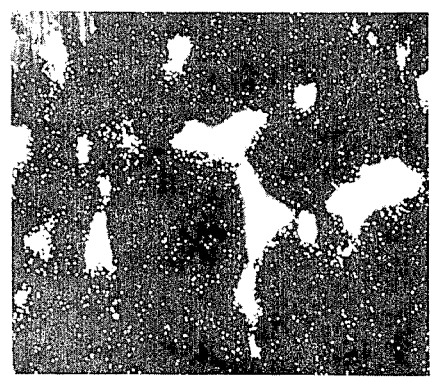

From FIG. 2, it will be seen that copper ions are permitted to uniformly diffuse along grain boundaries of semiconductor ceramics. In this way, the crystal grain boundaries are insulated, and thus, a semiconductor ceramic element is transformed to a dielectric element having a high dielectric constant.

According to the present invention, copper ions to be used for the purpose of insulation, are derived through diffusion in vapor phase from a crucible formed of a mixture of CuO and Al$_2$O$_3$, and thus the quantity of copper ions is controlled based on the concentration of copper ions in vapor phase. The quantity of evaporating copper ions and the concentration of copper in vapor phase can be controlled with the composition ratio of CuO and Al$_2$O$_3$ constituting the crucible, heat treatment temperature, and heat treatment time period as parameters. Furthermore, when a semiconductor ceramic body is placed in an atmosphere containing copper ions thus generated, such copper ions are permitted to diffuse in grain boundaries of the semiconductor ceramic body, and speed and quantity of diffusion is controlled on the basis of heating temperature and time period.

In this way, the concentration of copper ions at the surface of the semiconductor seramic body can be maintained, for a long time, to be uniform and stable in dependence on the concentration of copper ions in the vapor phase. Furthermore, because of the fact that copper ions are caused to diffuse from vapor phase, the concentration of copper ions is maintained to be substantially constant at any part of the surface of the ceramic body; thus, no substantial deviation occurs in the distribution of copper ions. Thus, diffusion of copper ions in grain boundaries of the ceramic body can be effected so that a uniform distribution of the copper ions can be achieved.

In contrast thereto, if copper ion source such as CuO or the like is applied directly onto the surface of a layer-built semiconductor ceramic chip to insulate the crystal grain boundaries thereof, then the following two problems will arise: Firstly, copper ions will tend to be nonuniformly applied. Secondly, it will be difficult to control chemical potential of copper at the position where the copper ion source is applied, because of the fact that copper ions are caused to diffuse, while being heated, directly from a solid body of the copper ion source into a multilayer chip. Thus, there will be the tendency that an increased dispersion is caused to occur in the dielectric characteristics of the resulting product.

In accordance with the present invention, copper ions are caused to diffuse from vapor phase as mentioned above, and thus, by controlling the vapor pressure of copper ions, control can be effected even with a much lower concentration of copper ions than that that can be controlled when copper ion source is directly applied. In vapor phase, control is possible with such a low concentration of coper ion source as $10^{-6}$, $10^{-4}$, $10^{-2}$, $10^{-1}$ (atm), for example, depending on temperature, and thus, it is considered that copper ions at the surface of a multilayer ceramic chip enveloped in the vapor phase will have a chemical potential corresponding to the concentration of copper ions. Thus, with diffusion of copper ions through vapor phase, control is possible with a low concentration of copper ions, so that the concentration of copper ions can be controlled to be suitable for diffusion into grain boundaries of a multilayer ceramic body. In the case where a copper ion source is applied directly onto the surface of the ceramic chip, unlike in the present invention, then the activity of copper ions at the applied portion of the surface will be equal or nearly equal to 1.0.

In the case where $Bi_2O_3$ and/or PbO is used as an insulating agent, inner electrodes formed of Pd or Pd-Ag will be subjected to chemical reaction with the insulating agent at a temperature of 1100° C. or higher and thus will tend to be damaged. In contrast thereto, in the case where Cu ions ($CuO + Al_2O_3$) are used as insulating agent in accordance with the present invention, inner electrodes consisting of Pd or Pd-Ag will never be damaged at a temperature of 1250° or lower. It is for this reason that copper ions are selected as insulating agent in the present invention.

As will be appreciated from the above discussion, the process of the invention wherein an insulating agent is transported, through diffusion from vapor phase, to crystal grain boundaries so that the latters are thereby insulated, is effective not only to solve the aforementioned problems with the prior art techniques but also to simultaneously and uniformly insulate a number of multilayer semiconductor ceramic chips.

Description will now be made of embodiments of the present invention. It is to be understood, however, that the present invention is by no means limited to such specific embodiments but covers all changes and modifications which will become possible without departing from the spirit and scope of the present invention.

EXAMPLE 1

A powder mixture was prepared which consists of $BaCO_3$, $TiO_2$, $SiO_2$ and $Dy_2O_3$ with a molar ratio of 1:1:0.01:0.001; the mixture was calcinated; the calcinated mixture was pulverized to produce a powder mixture; a binder was added to the powder mixture; and subsequently, by an extrusion process, the powder mixture was formed into semiconductor ceramics green sheets so that the thicknesses become equal to 0.60 mm and 0.25 mm after sintering. Thereafter, Pd paste was printed by using a screen on each of the green sheets so that each printed area becomes equal to $3.5 \times 3.5$ mm$^2$ after sintering. Five such green sheets were superimposed upon each other and adhered to each other under pressure, thus resulting in a layer-built structure incorporating four inner electrode layers. Subsequently, the layer-built structure was cut to pieces each having a predetermined dimension so that there were obtained layer-built chips, which in turn were fired in the air at 1280° C. for two hours. The dimension of each sample after the sintering step, excluding the outer electrodes such as shown in FIG. 1, was about $4.5 \times 4.5 \times 1.3$ mm$^3$ for the case where the thickness of each inner ceramics layer was 0.60 mm while it was about $4.5 \times 4.5 \times 1.3$ mm$^3$ for the case where the thickness of each inner ceramics layer was 0.25 mm.

Thereafter, the sintered chips thus obtained were disposed within a container made of a mixture CuO and $Al_2O_3$ with a molar ratio of 1:1 which was molded into a cylindrical body 30 mm in inner diameter, 50 mm in outer diameter and 50 mm in height and previously fired at 1200° C. for one hour, and then the chips were subjected to a heat treatment at 1200° C. for five hours. By such a heat treatment, copper ions contained in the material constituting the container were caused to uniformly diffuse from vapor phase into the grain boundaries of the semiconductor ceramics forming each of the chips disposed within the container, as shown in FIG. 2. In this way, vapor-phase-diffused boundary-layer type multilayer capacitors were obtained, which in turn were provided with outher electrodes through which the exposed portions of the respective inner electrodes of each chip were connected with each other. The outer electrodes were Ag electrodes formed by applying Ag paste and baking it at 800° C.

Table 1 shows the relations between the inner electrode spacing and the resistivities, before and after the heat treatment (diffusion in vapor phase), of the layer-built chips obtained as mentioned above, and Table 2 shows the relations among the inner electrode spacing, apparent relative permittivity, capacitance and dissipation factor, each after the heat treatment (diffusion in vapor phase), of the chips.

TABLE 1

| Inner Electrode Spacing (mm) | Resistivity (Ω-cm) before Heat-treatment | Resistivity (Ω-cm) after Heat-treatment |
| --- | --- | --- |
| 0.60 | 20 | $3.2 \times 10^6$ |
| 0.25 |  | $3.0 \times 10^7$ |

TABLE 2

| Inner Electrode Spacing (mm) | Apparent Relative Permittivity | Capacitance (nF) | Dissipation Factor (%) |
| --- | --- | --- | --- |
| 0.60 | 35000 | 19.0 | 5.4 |
| 0.25 | 33000 | 43.0 | 7.5 |

It will be appreciated from Table 1 that sufficient grain boundary insulation has been achieved with respect to the semiconductor ceramics by virtue of the heat treatment (diffusion in vapor phase), and it will also be appreciated from Table 2 that the vapor-phase-diffused boundary-layer type multilayer capacitor according to the present invention is so miniaturized as to be of such a small size as $4.5 \times 4.5 \times 1.3$ mm$^3$ and yet has as high a capacitance as 43 nF (for the case where the inner electrode spacing is 0.25 mm).

EXAMPLE 2

A semiconductor ceramics powder mixture of the same composition as that used in Example 1 was employed, which was formed by a doctor blade method into sheets having a thickness of 0.1 mm after sintering. Thereafter Pd paste forming inner electrodes was screen-printed on each of the sheets over an after-sintering area of 1.7×1.7 mm². Such sheets were superimposed upon each other and then compressed and adhered to each other by means of heat press. In this way, there was provided a layer-built structure incorporating inner electrode layers, which was cut to pieces having a predetermined dimension, so that layer-built chips were obtained. The layer-built chips thus obtained were fired in the art at 1280° C. for two hours. The dimension of each sample after firing was 2×2×0.6 mm³. A cylindrical container consisting of $CuO+Al_2O_3$ such as used in Example 1 was employed, and the chips disposed therein were subjected to heat treatment at 1150° C., 1200° C. and 1250° C. for five hours. After the heat treatment, Ag paste was applied to each chip and baked at 800° C. to form outer electrodes.

Table 3 shows the relations among the diffusion temperature, resistivity, apparent relative permittivity, capacitance and dissipation factor of a chip subjected to the heat treatment as mentioned above.

TABLE 3

| Diffusion Temperature (°C.) | Resistivity (Ω-cm) | Apparent Relative Permittivity | Capacitance (nF) | Dissipation Factor (%) |
|---|---|---|---|---|
| 1150 | $1.7 \times 10^9$ | 26000 | 20.0 | 1.4 |
| 1200 | $3.3 \times 10^9$ | 23000 | 17.7 | 0.8 |
| 1250 | $6.2 \times 10^9$ | 12000 | 9.2 | 2.2 |

It will be appreciated from Table 3 that sufficient grain boundary insulation has been achieved with respect to the semiconductor ceramics by virtue of the heat treatment and that the vapor-phase-diffused boundary-layer type multilayer ceramic capacitor according to the present invention is so miniaturized as to be such a small dimension as 2×2×0.6 mm³ and yet has as high a capacitance as 20 nF.

While in the foregoing examples, the compostion ratio of $BaCO_3$, $TiO_2$, $SiO_2$, $Dy_2O_3$ was selected to be 1:1:0.01:0.001, it is also possible that the $BaCO_3$ may be partially or wholly substituted with $SrCO_3$; by causing copper ions to be diffused in a multilayer semiconductor ceramics chip consisting of the resultant semicoductor ceramics, a boundary-layer type multilayer ceramic capacitor was obtained.

It is most suitable that the container comprising CuO, and ceramics chips are heated at a temperature in the range from 1100° C. to 1250° C., from an industrial point of view. At a temperature below 1100°, such a long period of time as 24 hours is taken to vaporize a material containing copper and cause copper ions to be diffused in grain boundaries of a semiconductor body. At a temperature exceeding 1250° C., the vapor pressure of a material containing copper builds up so that nonuniformity is caused to occur in diffusion of the copper as in the case where CuO is applied directly onto the surface of a semiconductor ceramics body and thus the latter tends to be damaged. Particularly at a temperature of 1280° C. or higher, the same elements as those shown in Table 3 predominantly represent dielectric loss exceeding 15%. Thus, in the foregoing embodiments, the upper limit of the heating temerature range was set at 1250° C. Although the heating time period was set up to 24 hours from the industrial standpoint as mentioned above, this refers to the time period during which heating is effected at a temperature in the range of 1100°-1250° C. as recited in the appended claims and does not mean that a constant temperature should essentially be maintained.

Although in the foregoing embodiments, the ratio of CuO and $Al_2O_3$ in the composition of the container was selected to be 1:1 by way of example, it is also possible that the quantity of CuO may be increased or decreased such that the ratio of CuO and $Al_2O_3$ becomes 5:1, 1:10 or 1:100, for example. With such compositions, too, it has been confirmed by means of EPMA that vaporization of the copper compound and diffusion of the copper compound into grain boundaries of a semiconductor body occurs at a temperature in the aforementioned temperature range of 1100°–1250° C.

While the present invention has been illustrated and described with respect to specific embodiments thereof, it is to be understood that the present invention is by no means limited thereto but encompasses all changes and modifications which will become possible within the scope of the appended claims.

We claim:

1. A method of manufacturing a multilayer ceramic capacitor comprising a dielectric body having insulated grain boundaries, inner electrodes, and outer electrodes, comprising the steps of:
   preparing green sheets of semiconductor ceramics;
   printing metal paste onto the surface of each of said green sheets of semiconductor ceramics to form the inner electrodes;
   stacking said sheets;
   applying a pressure to the stack of said sheets to cause said sheets to adhere to each other, while heating said stack, thereby forming a layer-built structure;
   cutting said layer-built structure into a plurality of multilayer chips in such a manner that the inner electrodes are exposed at opposing two surfaces of the chips;
   firing said chips to form multilayer semiconductor ceramic chips;
   thereafter, causing an insulating agent consisting of at least one component selected from the group consisting of copper ions and copper oxide to be thermally diffused in grain boundaries of said semiconductor ceramics, thereby insulating the grain boundaries;
   providing the outer electrodes on said opposing two surfaces of each of said chips; and
   maintaining said chips at an elevated temperature in a vapor-phase atmosphere including said insulating agent, so that ions of said insulating agent or a compound containing said insulating agent in said vapor-phase atmosphere are caused to thermally diffuse in the semiconductor ceramics constituting said chips through the grain boundaries thereof, thereby uniformly insulating the grain boundaries of said semiconductor ceramics constituting said chips.

2. The method according to claim 1, wherein said semiconductor ceramics consists of titanate of alkaline-earth metals doped with a substance to make said titanate semiconductive, said alkaline-earth metals being one or more selected from the group consisting of varium, strontium, calcium and magnesium.

3. The method according to claim 1, wherein the procedure of maintaining said chips in the vapor-phase atmosphere containing the insulating agent, comprises the steps of:

disposing said chips in a container formed of a fired mixture of CuO and $Al_2O_3$; and heating said container and said chips at a temperature in the range of 1100° C.–1250° C. for a period of time in the range from 1 minute to 24 hours, in the vapor-phase atmosphere containing said at least one component, thereby causing copper ions to be diffused through the grain boundaries of the semiconductor ceramics constituting said chips, and thereby insulating the grain boundaries of the semiconductor ceramics constituting said chips so that each of said chips is transformed to a dielectric body having a high dielectric constant.

* * * * *